(12) United States Patent
Kohavi et al.

(10) Patent No.: US 10,482,243 B2
(45) Date of Patent: Nov. 19, 2019

(54) MULTI-THREAT ANALYZER ARRAY SYSTEM AND METHOD OF USE

(71) Applicant: CYREN INC., McLean, VA (US)

(72) Inventors: Lior Kohavi, Ramat Hasharon (IL); Ido Rosner, Ramat Hasharon (IL); Geffen Tzur, Tel Aviv (IL); Friðrik Skúlason, Reykjavik (IS); Michael Kajiloti, Bat-Yam (IL)

(73) Assignee: CYREN, INC., McLean, VA (US)

( * ) Notice: Subject to any disclaimer, the term of this patent is extended or adjusted under 35 U.S.C. 154(b) by 186 days.

(21) Appl. No.: 15/442,743

(22) Filed: Feb. 27, 2017

(65) Prior Publication Data
US 2018/0046799 A1 Feb. 15, 2018

Related U.S. Application Data

(60) Provisional application No. 62/299,758, filed on Feb. 25, 2016.

(51) Int. Cl.
*H04L 29/06* (2006.01)
*G06F 21/56* (2013.01)
(Continued)

(52) U.S. Cl.
CPC .............. *G06F 21/56* (2013.01); *G06F 21/53* (2013.01); *G06F 21/554* (2013.01);
(Continued)

(58) Field of Classification Search
CPC ................................. G06F 21/00; H04L 63/00
See application file for complete search history.

(56) References Cited

U.S. PATENT DOCUMENTS

| 8,713,674 | B1 | 4/2014 | Geide |
| 9,152,789 | B2 | 10/2015 | Natarajan |

(Continued)

FOREIGN PATENT DOCUMENTS

WO 2015038775 3/2015

OTHER PUBLICATIONS

EP17158153, Extended European search report dated Jun. 22, 2017.
(Continued)

*Primary Examiner* — Joseph P Hirl
*Assistant Examiner* — Leynna T Truvan
(74) *Attorney, Agent, or Firm* — Alphapatent Associates, Ltd; Daniel J. Swirsky (57) ABSTRACT

A method for determining the threat level of a sample, comprising: providing a multi-analyzer array running on a server comprising a static analyzer, a plurality of dynamic analyzers, an arbitrator, at least one post processing process, and a normalizer process; analyzing the sample by the static analyzer to produce a static analysis; review of the static analysis by the arbitrator to determine which of the plurality of dynamic analyzers to utilize for dynamic analysis of the sample; dynamic analysis of the sample by one of the plurality of dynamic analyzers as chosen by the arbitrator to produce a dynamic analysis of the sample, normalizing the dynamic analysis by the normalizer to a format for post processing by the at least one post processing process; analysis of the normalized dynamic analysis by the at least one post processing process to provide a post processing analysis and to determine a threat level of the sample; and analysis by the arbitrator of the post processing analysis and the threat level of the sample to determine whether to further analyze the sample in one of the plurality of dynamic analyzers not previously chosen by the arbitrator.

24 Claims, 8 Drawing Sheets

(51) Int. Cl.
  *G06F 21/53* (2013.01)
  *G06F 21/55* (2013.01)
  *G06F 21/57* (2013.01)
(52) U.S. Cl.
  CPC .......... *G06F 21/562* (2013.01); *G06F 21/566* (2013.01); *H04L 63/1433* (2013.01); *G06F 21/552* (2013.01); *G06F 21/57* (2013.01)

(56) References Cited

U.S. PATENT DOCUMENTS

| | | |
|---|---|---|
| 9,171,160 B2 * | 10/2015 | Vincent .................. G06F 21/566 |
| 9,223,972 B1 | 12/2015 | Vincent |
| 2013/0091571 A1 * | 4/2013 | Lu .......................... G06F 21/563 |
| | | 726/23 |
| 2013/0298244 A1 * | 11/2013 | Kumar .................... G06F 21/52 |
| | | 726/25 |
| 2014/0283070 A1 | 9/2014 | Lewis |
| 2015/0096022 A1 | 4/2015 | Vincent |
| 2015/0121526 A1 | 4/2015 | McLarnon |
| 2015/0319182 A1 | 11/2015 | Natarajan |

OTHER PUBLICATIONS

"Data Conversion", Wikipedia, https://en.wikipedia.org/w/index.php?title=Data%20conversion&oldid=670232378 retrieved on Jun. 13, 2017.

* cited by examiner

MULTI-THREAT ANALYZER ARRAY SYSTEM AND METHOD OF USE

FIELD OF THE INVENTION

The present invention is of a system for threat analysis and more specifically for a multi-analyzer array and method of use thereof for determining the threat level/malicious potential of an analyzed sample.

BACKGROUND OF THE INVENTION

Sandboxes are a powerful tool for automated (or semi-automated) analysis of malware or suspected malware. Sandboxes are used for several purposes: Automated analysis of unknown files to determine if a file is malicious or not; Behavioral analysis of known malware, for example to get a detailed description of its behavior; Malware classification to cluster similar malware together for the purpose of creating generic/heuristic detection rules; and automated generation of detection rules that can be used by antivirus (AV) programs to detect the analyzed malware.

One of the limitations of sandboxes is that they can be evaded. It is becoming more and more common for malicious programs to detect if they are being run in a sandbox, and then alter their behavior accordingly. This alteration might include disabling some or all of the malicious activity, modifying it so that in-sandbox behavior is significantly different from real-world behavior, or initiating multi-stage attacks that take a long time to execute and are thus not observed within the timeframe of the analysis.

Running suspected malware in another sandbox is a possible option however; such an approach is very resource intensive and cumbersome and is complicated by various factors: sandboxes are different, and may not all detect the same set of actions, even if every effort is made to configure the sandbox environment identically; one sandbox may miss something another sandbox detects; the analysis syntax of each sandbox is different; and some sandboxes create complex reports based on the observed malware while others only provide raw output files.

In addition to a sandbox, other analysis tools can be provide further analysis of the threat or can provide further information about data observed by the sandbox. However, this data must be manually transferred to these analysis tools and there is no way to holistically assess the original threat taking into account both the sandbox output as well as the output of these other tools.

It would therefore be advantageous to have a threat analysis system that was completely automated, with the ability to circumvent evasion techniques and provide a holistic analysis of the threat based on different analysis systems while at the same time making efficient use of computing resources.

SUMMARY OF THE INVENTION

The present invention overcomes the deficiencies of the background art by providing a threat analysis framework for determining the threat value/maliciousness of a sample. In order to overcome the evasion of a particular sandbox or analysis tool, the framework comprises a multi-analyzer array, where a dynamic decision is made to analyze the sample in as many of these analyzers until it has activated. Threat analyzers comprise sandboxes, sandbox-less environments, and other dynamic and static threat analysis tools. The framework also comprises threat analysis post-processing tools such as IDS and URL/IP/Email reputation that are automatically called upon to contribute to the threat score thus providing a holistic threat analysis and overcoming the limitations of prior solutions.

In order to allow for efficient use of multiple threat analyzers a translation and normalization function is provided for all interaction with these. Requests to the threat analyzers are translated from a generic syntax into the syntax used by each analyzer. In the reverse direction, all reports provided by the analyzers are normalized into a format that can be processed by the array to determine a threat score/level for the sample and to determine whether the analysis needs to be run in more than one analyzer. The translation and normalization tools enable an open framework that allows simple addition of further analyzers or threat analysis tools.

In operation, the array is provided with a sample for analysis by a client. The array comprises at least two analyzers such as sandboxes, a central database (DB), and multiple analysis and supporting processes. These processes either run on the database hardware or on separate hardware. The client uploads the sample to the DB to initiate an analysis at the end of which the sample will be assigned a threat level or maliciousness score indicating the likelihood that the sample is malicious. As a non-limiting illustration, the score may vary between 0-13 representing a sample that exhibits no malicious activity, and 100—representing a definitely malicious sample. Any scale or series of numbers or letters may alternatively be used to indicate a level of maliciousness.

The DB queues the sample for an initial static analysis by the static analyzer process. The results of the static analysis are then analyzed by an arbitrator which defines the environment and parameters for dynamic analysis. A dispatcher process then activates the appropriate analyzer or other components for analysis. The analysis of each analyzer provides output data. As above, requests to the analyzers are translated by a translator and reports from the analyzers are normalized by a normalizer. The dispatcher saves the completed dynamic analysis in the DB and a post-processing analysis of the dynamic analysis is initiated. At the completion of the post-processing, the sample is allocated a threat score.

The score and results of the post-processing analysis are examined by the arbitrator which then determines whether a further dynamic analysis is required. In this way, computing resources are efficiently used since the sample is not simply forwarded to every analyzer, sandbox or analysis tool, but is rather directed to extract the most relevant analysis using a minimum of array resources.

The analysis may be stopped by the arbitrator once a sufficiently malicious determination has been made or alternatively continued even once a malicious determination has been made in order to extract as much information as possible from the sample. A sandbox-less environment is preferably provided for samples that manage to evade most or all sandboxes and analyzers. The sandbox-less environment is monitored externally to prevent detection of monitoring tools and subsequent evasion by the sample.

Samples with a score indicating malicious behavior may then be defined as malicious samples. Signatures identifying malicious samples are preferably created (by external systems) following the analysis, to be used by Internet security systems to identify these threats and related threats in the wild. Additionally, sandbox and analyzer output data such as domains, URLs, or IP addresses accessed by the malicious sample are forwarded to URL threat and IP address threat databases which are consulted by Internet security systems in order to block access to these URLs or IP addresses.

A visualization tool is also provided as part of a reporting server in order to present the analysis process including the stage of analysis, current threat score, and components used as part of the analysis.

According to at least some embodiments of the present invention a method for determining the threat level of a sample comprises: providing a multi-analyzer array running on a server comprising a static analyzer, a plurality of dynamic analyzers, an arbitrator, at least one post processing process, and a normalizer process; analyzing the sample by the static analyzer to produce a static analysis; review of the static analysis by the arbitrator to determine which of the plurality of dynamic analyzers to utilize for dynamic analysis of the sample; dynamic analysis of the sample by one of the plurality of dynamic analyzers as chosen by the arbitrator to produce a dynamic analysis of the sample, normalizing the dynamic analysis by the normalizer to a format for post processing by the at least one post processing process; analysis of the normalized dynamic analysis by the at least one post processing process to provide a post processing analysis and to determine a threat level of the sample; and analysis by the arbitrator of the post processing analysis and the threat level of the sample to determine whether to further analyze the sample in one of the plurality of dynamic analyzers not previously chosen by the arbitrator.

Preferably, the at least one post processing process comprises a process selected from the group consisting of: an OS analyzer; a network analyzer; file analyzer; image analyzer; and scorer. Preferably, the network analyzer gathers further analysis of network traffic from the reputation systems and/or IDS. Optionally the array further comprises a translator wherein the translator translates requests for analysis sent to the analyzers. Preferably the array further comprises a database wherein the database stores at least one of task queues for processes in the array; the dynamic or the static analyses.

Preferably at least one of the plurality of analyzers is a sandbox and preferably, the sandbox comprises clients with configurations differentiated by at least one of: operating system, network configuration, software and/or hardware architecture, software configuration, or hardware configuration. Preferably at least one of the plurality of analyzers is a sandbox-less environment wherein the sandbox-less environment comprises application modules designed to simulate human activity, wherein the simulated activity includes at least one of mouse movements, keyboard strokes, website form interaction or dialog window interaction. Optionally, these same modules are also provided in at least one other sandbox. Optionally, the application modules are recorded based on actual user activity that is played back on the sandbox or sandbox-less.

Preferably each of the plurality of analyzers comprises a configuration selected from the group consisting of: sandbox developer, operating system, network configuration, software and/or hardware architecture, software configuration, hardware configuration, and a combination of the above. Preferably the static analysis comprises at least one of basic emulation, YARA analysis and antivirus analysis.

Preferably the method further comprises providing a visualization of the determining of the threat level comprising, via a web interface, graphically portraying the stages in the determining using the threat level with icons representing the static analysis, the dynamic analysis, the post processing interconnected by lines illustrating the flow of the determining, and updating the determined threat level represented by a score as the score is calculated.

According to other embodiments of the present invention a system for determining the threat level of a sample comprises: a multi-analyzer array comprising: a static analyzer, a plurality of dynamic analyzers, an arbitrator, at least one post processing process, and a normalizer process; wherein the sample is analyzed by the static analyzer to produce a static analysis; wherein the arbitrator reviews the static analysis to determine which of the plurality of dynamic analyzers to utilize for dynamic analysis of the sample; wherein one of the plurality of dynamic analyzers as chosen by the arbitrator performs dynamic analysis of the sample to produce a dynamic analysis of the sample, wherein the normalizer normalizes the dynamic analysis to a format for post processing by the at least one post processing process; wherein the at least one post processing process analyzes the normalized dynamic analysis to provide a post processing analysis and to determine a threat level of the sample; and wherein the arbitrator analyzes the post processing analysis and the threat level of the sample to determine whether to further analyze the sample in one of the plurality of dynamic analyzers not previously chosen by the arbitrator.

Preferably the at least one post processing process comprises a process selected from the group consisting of: an OS analyzer; a network analyzer; file analyzer; image analyzer; and scorer. Preferably the array further comprises reputation systems and IDS and the network analyzer gathers further analysis of network traffic from the reputation systems and/or IDS. Preferably the array further comprises a translator wherein the translator translates requests for analysis sent to the analyzers.

Preferably the array further comprises a database wherein the database stores at least one of task queues for processes in the array; the dynamic or the static analyses. Preferably at least one of the plurality of analyzers is a sandbox wherein the sandbox comprises clients with configurations differentiated by at least one of: operating system, network configuration, software and/or hardware architecture, software configuration, or hardware configuration. Preferably at least one of the plurality of analyzers comprises a sandbox-less environment, wherein the sandbox-less environment comprises application modules designed to simulate human activity, wherein the simulated activity includes at least one of mouse movements, keyboard strokes, website form interaction or dialog window interaction.

Preferably each of the plurality of analyzers comprises a configuration selected from the group consisting of: sandbox developer, operating system, network configuration, software and/or hardware architecture, software configuration, hardware configuration, and a combination of the above. Preferably, the static analysis comprises at least one of basic emulation, YARA analysis and antivirus analysis.

Preferably the array comprises a visualizer wherein the visualizer provides a visualization of the determining of the threat level comprising, via a web interface, graphically portraying the stages in the determining the threat level with icons representing the static analysis, the dynamic analysis, the post processing interconnected by lines illustrating the flow of the determining, and updating the determined threat level represented by a score as the score is calculated.

The term malware as used herein describes any form of malicious or intrusive software, including computer viruses, worms, troj an horses, rootkits, backdoors, ransomware, spyware, adware, scareware, malicious objects, and other malicious programs, and these terms may be used interchangeably herein. Malware as used herein may be in the form of executable code, scripts, active content, and other software. Antivirus (AV) may also be referred to as anti-malware and the terms may be used interchangeably herein.

Analysis using the array is said to be performed on a sample or a resource (terms used interchangeably). As used herein a sample might be any of a data file, executable code, scripts, active content, a URL, and other software. A sample may be known to be malware or may be suspected to be malicious or may be thought to be non-malicious. A sample is said to be activated, run, or detonated within a sandbox.

Static analysis of a sample comprises extraction of data about the sample without actually running the entire sample such as in a sandbox. Dynamic analysis refers to activating the sample such as running an executable file or script in a sandbox. The output of the array is at least a threat level, threat score, maliciousness level, or maliciousness score (terms used interchangeably) as described further herein.

The dynamic analysis is said to be performed by a sandbox or analyzer differentiated by configuration or environment or client which comprise variations in operating system, architecture (32 or 64 bit), hardware, and network. The terms sandbox, analyzer, configuration and environment may be used interchangeably.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computer" on a "computer network", it should be noted that optionally any device featuring a data processor and the ability to execute one or more instructions may be described as a computer, computing device, or mobile computing device, or user device including but not limited to any type of personal computer (PC), a server, a cellular telephone, an IP telephone, a smartphone, a PDA (personal digital assistant), or a pager. A server as used herein may refer to any of a single server, multiple servers, distributed servers or cloud computing environment. Any two or more of such devices, as listed above, in communication with each other may optionally comprise a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1A:
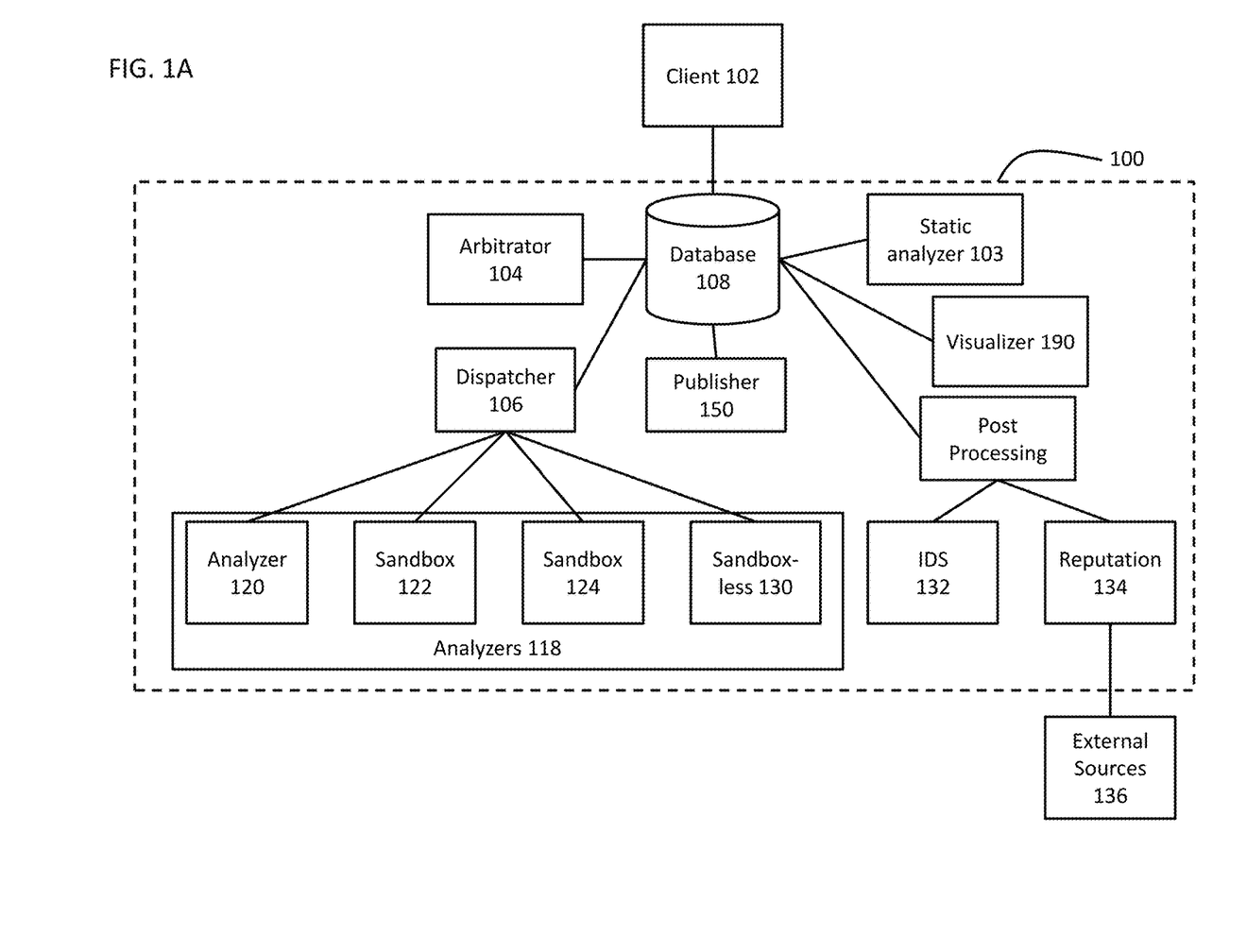
FIGS. 1A-1B are schematic diagrams of a multi analyzer array and components and processes thereof according to at least some embodiments of the present invention.
Figure 1B:
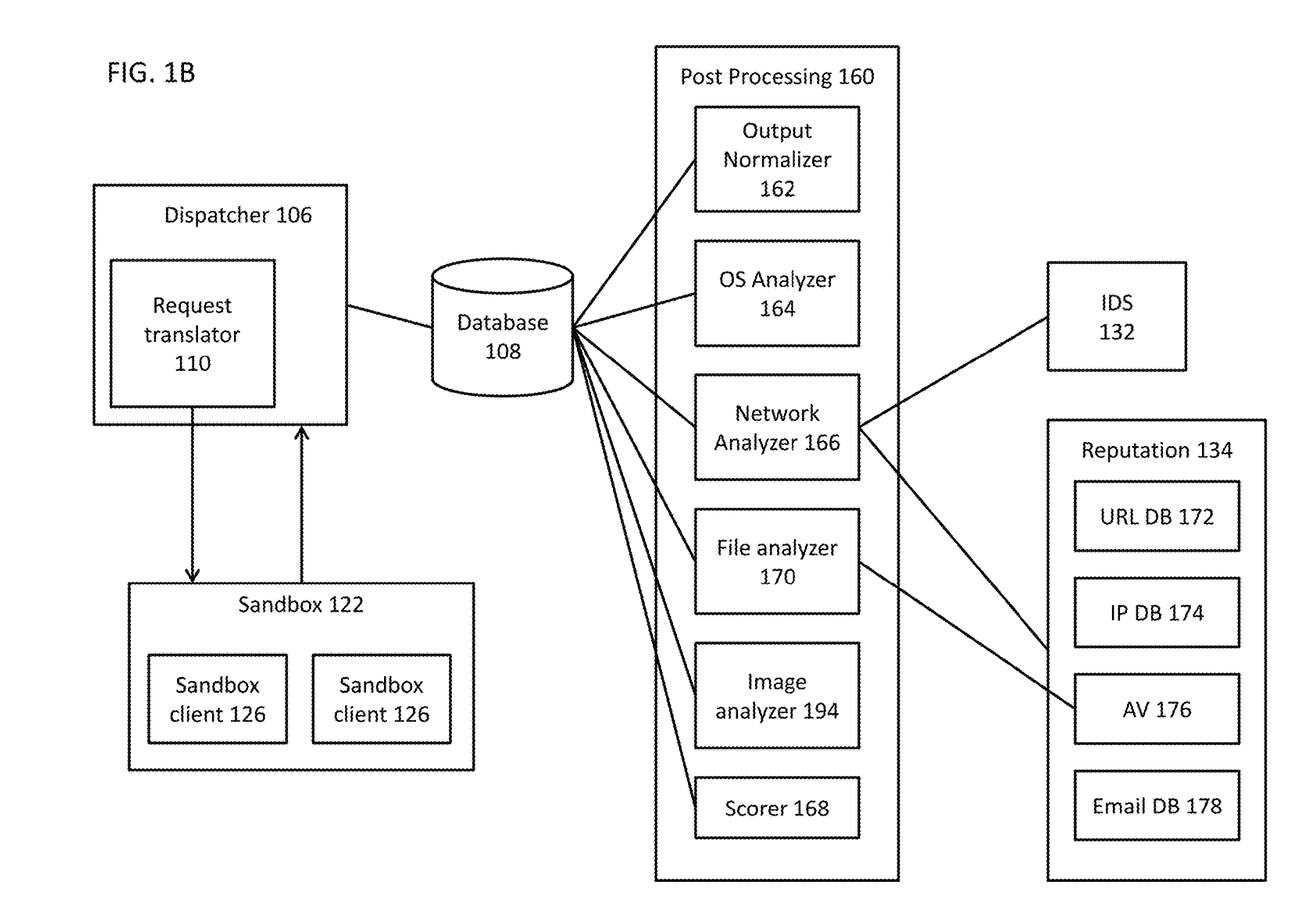

The present invention is of a multi-analyzer array for determining the threat potential of an analyzed sample. Reference is now made to FIGS. 1A and 1B which are schematic diagrams of a multi analyzer array and components and processes thereof according to at least some embodiments of the present invention. As shown in FIG. 1A, array 100 comprises software components and processes necessary for analysis of a sample to determine the likelihood of a sample to be malicious. The components and processes of array 100 are software modules and/or processes and run on one or multiple servers according to the definition of computer or computing device above. Array 100 is optionally scalable to support any number of concurrent analyses of samples by addition of hardware and components as required. All components and processes of the array are in data communication with one another as required.

Client 102 which runs on a computer provides the sample for analysis to array 100. The sample may be sourced from any source including the non-limiting examples of an email, web proxy, honeypot, sample repository, website or similar. The sample is optionally part of a cluster of similar samples such that any determination regarding maliciousness of one member of the sample cluster will apply to the other members of the sample cluster.

Client 102 may be part of an automated sample collection and analysis system or may be operated by a human analyst submitting a sample to array 100 for analysis. Client 102 is connected to array 100 via a network connection. Optionally array 100 is provided as a cloud-based service and client 102 comprises a web browser (not shown) for submitting analysis requests. At the end of the analysis process, array 100 returns a maliciousness rating for the sample to client 102, along with a detailed analysis report.

Array 100 comprises database 108 which stores at least: task queues for other processes in the array; dynamic and static analyses provided by other components or processes of array 100; configuration and settings for array 100, samples and score data. Processes running in the array 100 each poll database 108 for their task queue which is updated in database 108 as described further below.

Static analyzer process 103 is used at the start of the analysis of a sample to perform a static analysis of the sample. Static analyzer comprises at least processes and/or software for performing basic emulation, YARA analysis and antivirus analysis as described further below.

Arbitrator process 104 which analyzes the result of the static analysis of a sample and determines the appropriate dynamic analysis environment for continued analysis of the sample. After every dynamic analysis has been completed and post-processed, arbitrator 104 reviews the results to determine if further dynamic analysis is required or whether to terminate the analysis;

A dispatcher process 106 activates the appropriate dynamic analyzer as determined by arbitrator 104. Dispatcher 106 comprises request translator 110 for adapting analysis requests to the syntax of the specific analyzer being used. Dispatcher 106 also fetches completed analyses from analyzers 118 and stores them in database 108.

Analyzers 118 comprise a variety of dynamic analysis environments. Each environment may differ in at least one of: sandbox developer, operating system, network configuration, software and/or hardware architecture, software configuration, or hardware configuration. Each of analyzers 118 may be a sandbox, such as sandboxes 122 and 124 or may be a different environment employing different technologies for dynamic sample analysis as in analyzer 120. Optionally, at least a portion of analyzers 118 are the same or similar and multiple versions of the same analyzer or sandbox are provided to increase the scale of array 100.

For the purposes of illustration, analyzers 118 comprises four components, 120, 122, 124, and 130, but it should be appreciated that any number of sandboxes or analyzers may be deployed as part of array 100. For simplicity, only sandbox 122 may be described below; however this may refer to any of sandboxes 122, and 124.

As shown in FIG. 1B, sandbox 122 comprises sandbox clients 126. Sandbox clients are the actual environments or configurations in which activation of samples is attempted. Each sandbox client is configured according to variations in operating system, architecture (32 or 64 bit), hardware, and network. Multiple similar configurations may be provided for load balancing purposes.

To enable analysis of samples that successfully evade other analyzers, a sandbox-less environment 130 is provided. Sandbox-less 130 comprises one or many environments configured with variations in operating system, architecture (32 or 64 bit), hardware, and network. No monitoring or recording software is present on sandbox-less 130 to encourage samples to activate since no monitoring environment is detected. Sandbox-less 130 comprises external monitoring of all network traffic so that this can be analyzed for malicious behavior. Additionally, the sandbox-less environment 130 is analyzed (snapshot) before and after activation of the sample to compare and note any differences. Sandbox-less 130 comprises application modules designed to simulate human activity, so that malware designed to execute only on active computers will activate. Non-limiting examples of human activities simulated in sandbox-less 130 include: mouse movements, keyboard strokes, website form interaction and dialog window interaction.

Post processing 160 comprises components and processes used to process the outputs of dynamic analyzers 118. As described above, analyzers 118 produce outputs/reports with different fields and in different formats. To allow interworking of multiple different components, these reports are normalized to allow consistent analysis by post processing 160. Output normalizer 162 normalizes the OS activity report provided by each of analyzers 118 and stored in database 108 by dispatcher 106. Output normalizer 162 also preferably normalizes the other outputs from analyzers 118. The normalized reports are also stored in database 108. The normalized OS reports are analyzed by the OS analyzer process 164. Other normalized reports are analyzed by other post-processors as described below.

Reports describing network activity are analyzed by network analyzer process 166. Network analyzer 166 analyzes the network traffic report produced by analyzers 118 and also gathers further analysis from IDS 132 and reputation systems 134. File analyzer process 170 analyzes files that are dropped (either written on the fly or downloaded) by a sample being analyzed. File analyzer 170 may submit the file being analyzed to antivirus (AV) 176. Image analyzer 194 provides analysis of screenshots provided by one of analyzers 118. Scorer 168 takes the results of the components and processes from post processing 160 and calculates a threat score as described further below. Array 100 comprises a network signature analysis component such as an intrusion detection system (IDS) 132. IDS 132 is the same or similar to IDSs as known in the art and is used in array 100 for post processing of network traffic analyzed by network analyzer 166 as captured by analyzers 118.

Array 100 comprises reputation systems 134 called on as part of the post-processing of data captured by analyzers 118. Reputation systems 134 comprises: URL database 172 storing known malicious and suspected malicious URLs; IP address database 174 storing known malicious and suspected malicious IP addresses; AV 176 for scanning samples found as part of dynamic analysis within array 100; and email database storing and analyzing email related data. Following analysis of a sample, reputation systems 134 are preferably updated with newly discovered malicious data. Reputation systems 134 are preferably fed with updated threat information by external sources 136 which comprises information feeds or other analysis systems. A non-limiting example of such a service is Open IOC. Reputation systems 134 is here shown for simplicity as comprising one of each reputation service however it should be understood that any number of services may be consulted or form part of array 100 and that the services are not limited to only those described here. Optionally, post processing 160 comprises further post-processing tools, components or processes and array 100 is open to allow simple integration of such tools.

Publisher process 150 presents analysis of sample data to client 102 or to other external systems (not shown) using one or more of RSS, email, a reporting API, a raw data format, or any other suitable format or interface. Visualization process 190 preferably provides a web interface for displaying the real-time flow and scoring path of a given sample as further illustrated below.

Translator 110 and normalizer 112 are adapted for each analysis component that is part of array 100. In this way, as new components such as different sandboxes, are added to array 100, additional translators 110 and normalizers 112 are added to match the syntax and output structure of the added component. Array 100 is therefore not limited to the components described herein but may be expanded to include any other analysis component whether currently existing or to be developed in the future.

Figure 2A:
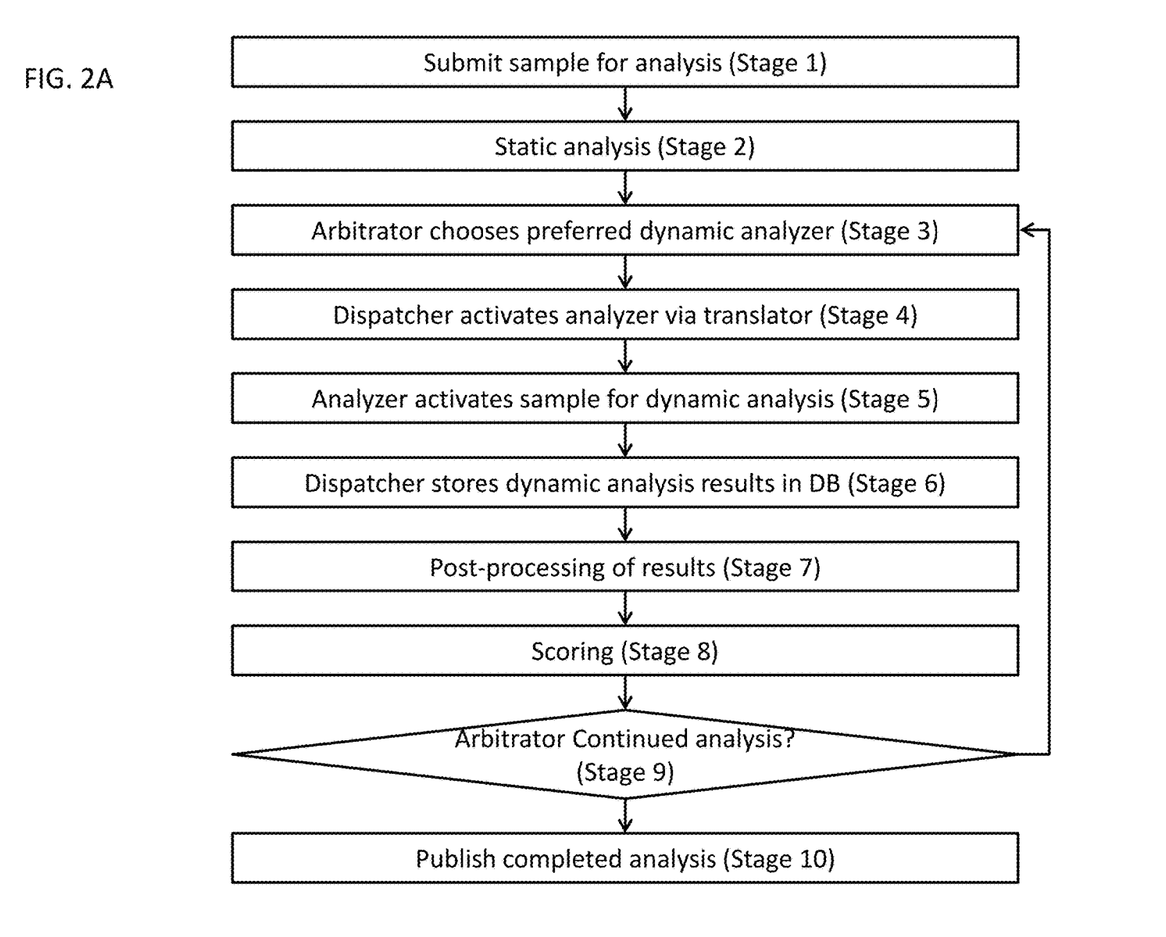
FIGS. 2A-2B are flow diagrams describing the operation of a multi-analyzer array according to at least some embodiments of the present invention.

Reference is now made to FIGS. 2A-2 which are flow diagrams describing the operation of a multi-analyzer array according to at least some embodiments of the present invention. The flow of FIGS. 2A-2 is implemented on the array as described in FIGS. 1A and 1B above. In stage 1, client 102 submits a sample to array 100 via a request including the sample. The request may take the form of an HTTP PUT or HTTP POST instruction sent from client 102 to database 108. Having received the sample, database 108 adds a task for static analysis by static analyzer 103.

In stage 2, static analyzer performs an initial static analysis. The analysis is defined as static as the sample is not executed as in the dynamic execution of the sandbox environment. The static analysis comprises at least: basic emulation, YARA analysis and antivirus analysis. Optionally the static analysis may be extended to include other tools or processes. The primary aims of the initial static analysis are: determining which environment the sample will run in, such as the non-limiting examples of Windows, 32 bit/64 bit, Android (mobile), Linux, etc.; determining the expected behavior of the sample; determining the file types packed within the sample (in the case of an archived, compressed, or packed sample), identifying malicious behavior or content, and determining a threat score based on the static analysis.

Determining the expected behavior is particularly important as this will provide an indication in the later dynamic analysis as to whether the sample is evading the sandbox/dynamic analyzer. For example, the basic analysis may determine that the sample alters registry values. Should the sandbox analysis fail to show altered registry values, this will indicate that the sample has detected the sandbox and is not executing its full functionality. Non-limiting examples of expected behavior include: manipulation of processes at the user level, network activity, create or control services, manipulation of processes at the kernel level, service-related activity at the kernel level, create mutex, create/spawn processes, hook windows, sleep, create registry keys or set values, delete registry keys or values.

At the completion of the static analysis for the sample, static analyzer 103 writes the findings of the static analysis into database 108, and also creates a task for arbitrator 104 to review the static analysis.

In stage 3, the arbitrator reviews the static analysis of stage 3 and determines which analyzer environment from analyzers 118 is suitable for performing dynamic analysis. The choice of initial analyzer or sandbox and sandbox client will be influenced by, for example, the environment determined in the basic analysis of stage 2. Alternatively, the dynamic analyzer may be chosen based on load balancing constraints within the array, or based on the relative confidence in a particular analyzer. Having determined the preferred environment, the arbitrator creates a task in database 108 for the dispatcher 106 to activate the preferred analyzer from analyzers 118.

In stage 4, the dispatcher 106 creates an analysis instruction to the chosen analyzer such as sandbox 122, and executes the instruction through translator 110 which is adapted to translate the generic request of dispatcher 106 into the syntax understood by sandbox 122. The request preferably includes the requirements for analysis so that the correct sandbox client 126 is used. Non-limiting examples of environment parameters include: operating system (OS) such as Windows, iOS, Android, Linux, and similar; 32 bit or 64 bit; network parameters such as IP address, country (IP address), DNS services, internet simulation, SSL termination, and similar; and hardware such as physical or virtual hardware and hardware type, such as mobile, Intel, ARM, or similar.

In stage 5, The chosen analyzer such as sandbox 122 attempts to activate the sample and records all activities of the sample including network traffic such as data sent and received and OS activity such as files and folders created and deleted and changes made to system settings such as the registry (for Windows). Preferably, the chosen one of analyzers 118 also provides samples of files dropped by the analyzed sample as well as screenshots showing activity during activation of the sample. When the analysis is complete the analyzer notifies the dispatcher 106.

In stage 6, dispatcher 106 collects the dynamic analysis report (which may comprise multiple parts as described above) from the chosen analyzer from analyzers 118 and stores the report in database 108. In stage 7, post processing analysis of results is performed as described further below with reference to FIG. 2B.

Following the completion of each post-processing analysis, scorer 168 is activated to calculate the threat score of each post processing analysis. It should be appreciated that both malicious and non-malicious samples may exhibit the same behavior—for example, amending the windows registry. Therefore, malicious behavior is usually a combination of behaviors (also referred to herein as risks) each with a score that is weighted depending on the level of maliciousness. Scorer 168 therefore totals and aligns these scores to arrive at an assessment of the level of maliciousness of a sample. Choice of the scoring is therefore a sensitive issue as "over-scoring" a particular behavior may result in a false positive (defining a sample as malicious when it is not). The scoring levels are therefore adjusted by the operator of array 100 based on experience and experimentation with known good and bad samples.

Following the completion of the last of the post processing analyses (which may vary per sample depending on the complexity of the analysis) scorer 168 calculates the cumulative score for all of the post processing analyses and then the cumulative threat score of the combined post processing analyses and the static analysis. The final output is a threat score for the analyzed sample. If further dynamic analyses are performed (as described below) then scorer 168 will combine the post processing analyses of all dynamic analyses with that of the static analysis to arrive at a threat score for the analyzed sample. Once scoring is complete, a task is again created for the arbitrator 104.

In stage 9 arbitrator 104 analyses the results of the post processing analyses from stage 7 as well as the scoring determined in stage 8 in order to determine whether it is necessary to continue the analysis in a different dynamic analyzer. The determination will depend on several factors: whether the sample exhibited all of the expected behavior or not—indicating potential evasion of the sandbox, or potential incompatibility of the analysis environment; whether additional risks, behaviors, configuration issues or functionality of the sample were exposed in the first sandbox, necessitating a further review; how high the threat level/score is and whether a further analysis will significantly add to the score; whether a further analysis will provide more and valuable information about the sample. A non-limiting example of a behavior requiring further analysis is discovery that the sample is attempting to use secured communications such as with SSL. In this case an analyzer/configuration with SSL termination would be chosen for the next dynamic analysis.

If it is determined that analysis in another dynamic analyzer is required then the process from stage 3 till 9 is repeated potentially resulting in an adjustment of the threat score. If it is determined that further analysis is not required then at stage 10 the analysis is terminated and the results of the analysis are published by publisher 150.

Stage 5 (dynamic analysis) is optionally performed by the sandbox-less environment 130 to capture OS and network activity of the sample if the sample has evaded other analyzers. The activation and analysis of sandbox-less 130 proceeds as for stages 5 till 9. Following activation of the sample in sandbox-less 130 and based on the ensuing analysis it may be determined to run the sample in a further analyzer and stages 3 till 9 will be repeated until arbitrator 104 determines that the analysis should terminate at stage 10.

Figure 2B:
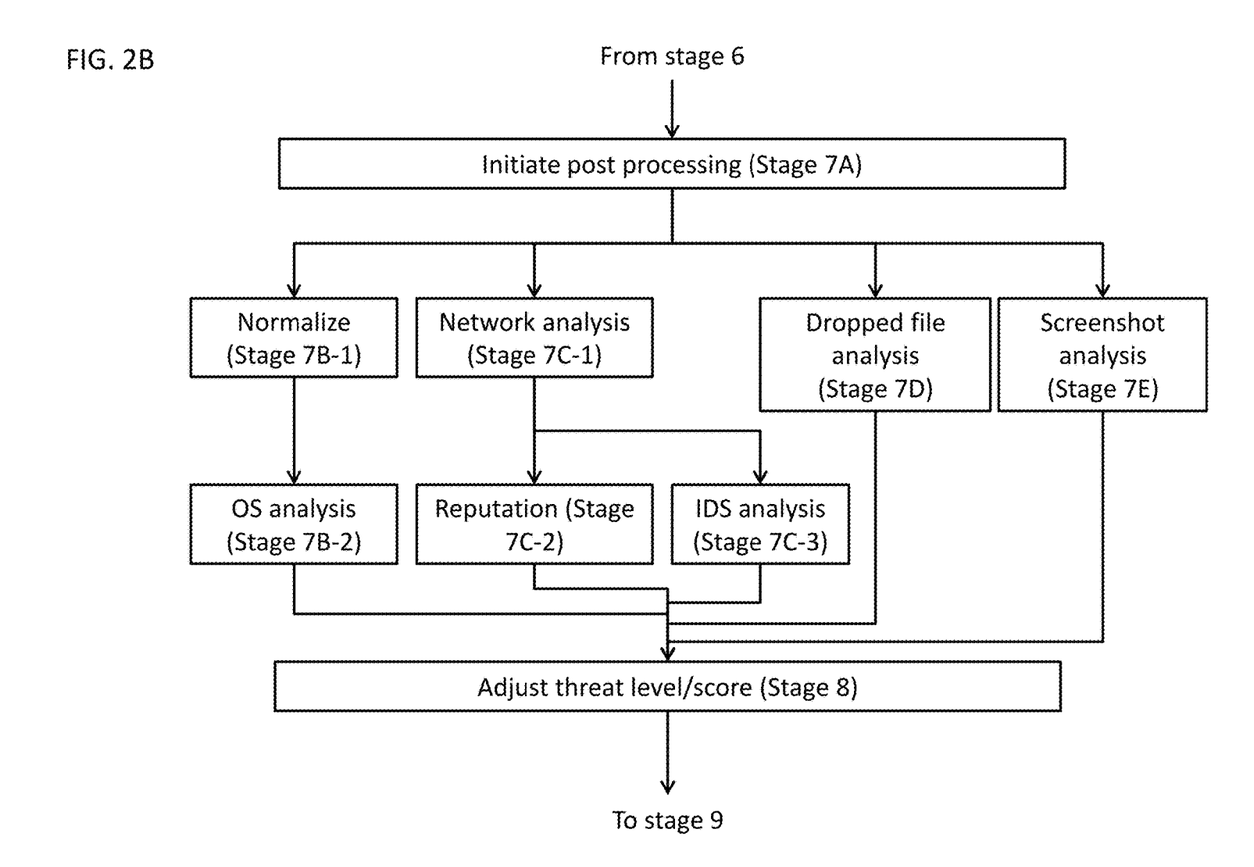

Post processing stage 7 comprises several stages as shown in FIG. 2B and as described further below. In stage 7A the post processing is initiated when dispatcher 106 stores the dynamic analysis results created in stage 5. The post processing will depend on the results of the dynamic analysis and can include the following stages:

Stage 7B provides for analysis of OS behavior. In stage 7B-1, the normalizer 162 adapts the output OS activity report from the analyzer to a generic format that can be processed by OS analyzer process 164. The report is optionally in a JSON format before normalizing. Once the report has been normalized it is stored in the DB 108 and OS analyzer 164 is tasked with analysis.

At stage 7B-2 OS analyzer 164 analyzes the normalized OS activity report to determine if activity has been initiated by the analyzed sample that is considered a risk (malicious or potentially malicious). Non-limiting examples of such activity include: Creating a mutex; creating or modifying more than 25 files; deleting AuthRoot certificates, attempting to delete proxy settings, sleeping for a short time, monitoring a large number of processes, creating a hidden file/s, starting a process from a suspicious location, modifying the browser homepage or search URL, creating a service, opening protected storage, attempting to delete registry keys or proxy settings, or creating new registry paths. The listing of risk activity and related scoring is defined by the operator of array 100 and stored in database 108. Once OS analyzer 164 has determined the list of risk activities based on its analysis, the scorer process 168 is tasked with scoring the results as at stage 8.

Stage 7C provides for analysis of network behavior. In stage 7C-1, the network activity that was captured by the sandbox/analyzer behavior is analyzed by network analyzer process 166 to determine if activity has been initiated by the analyzed sample that is considered a risk. Optionally, stage 7C-1 includes normalization such as by normalizer 162 of the input data. A non-limiting example of normalization is grouping the network traffic into request-response pairs which are stored in DB 108. Following this normalization network analysis proceeds with one or both of stages 7C-2 and 7C-3.

In stage 7C-2 network data including but not limited to URLs, domains, IP addresses, network behavior parameters and email traffic (such as SMTP requests) are queried by network analyzer 166 at reputation services 134 and specifically at URL DB 172, IP address DB 174, and email DB 178. Network behavior parameters may for example be queried opposite a system storing indication of compromise (IOC) data. The reputation services 134 respond with a either a reputation score for the queried network data or an indication that the network data is known to be malicious, suspected malicious, unknown, or known to be clean.

In stage 7C-3, network signature based analysis of the network traffic is performed by IDS 132 or similar network signature based system and the results are returned to network analyzer 166. IDS detection is preferably based on risk signatures stored and updated in IDS 132. Non-limiting examples of potentially malicious network activity that may be detected by network analyzer 166 and/or IDS 132 include: a high percentage of total connections have failed; multiple HTTP transactions were initiated with path similarity between different hosts; HTTP requests were sent with an unknown User-Agent value; application-type files were downloaded over HTTP; connections were made to 10 or more unique IP addresses. Alternatively any type of network activity can be scored. The listing of risk activity and related scoring is defined by the operator of array 100 and stored in database 108. Once network analyzer 166 has determined the list of risk activities based on its analysis, the scorer process 168 is tasked with scoring the results as at stage 8.

Stage 7D provides for analysis of files dropped by the sample when activated in the sandbox or other analyzer 118. The file signatures (hash values) are looked up by file analyzer 170 in the reputation systems 134 (such as via AV 176) and also checked with previous analyses in DB 108. If matches to known suspicious or malicious files are found, then this will increase the threat level/score of the sample. If the dropped files are unknown to the reputation systems 134 or to the database 108, then each of these files is preferably analyzed by array 100 to determine a threat score for the dropped file. This threat score is preferably used to alter the threat score of the sample under analysis. The related scoring for malicious or potentially malicious dropped files is defined by the operator of array 100 and stored in database 108. Once file analyzer 170 has determined the status of dropped files based on its analysis, the scorer process 168 is tasked with scoring the results as at stage 8.

Stage 7E provides for analysis of screenshots captured by the sandbox or other analyzer 118 during the analysis of the sample by image analyzer 194. The image is broken down and know malicious behavior associated with a particular screen behavior is thus detected. The related scoring for malicious or potentially malicious screen activity is defined by the operator of array 100 and stored in database 108. Once image analyzer 170 has completed its analysis, the scorer process 168 is tasked with scoring the results as at stage 8.

Reference is now made to FIGS. 3A-3D which are exemplary screenshots providing visualization of the analysis flow of a sample through a multi-analyzer array according to at least some embodiments of the present invention. The visualization 300 provides a means to show the adaptive analysis process as illustrated in FIG. 2A. Visualization 300 is generated by visualizer process 190 monitors DB 108 for updated activity as recorded by the processes and components of array 100. As activity is updated, for example completion of OS analysis (stage 7B-2 as described above), visualizer 190 displays the results of that analysis.

Figure 3A:
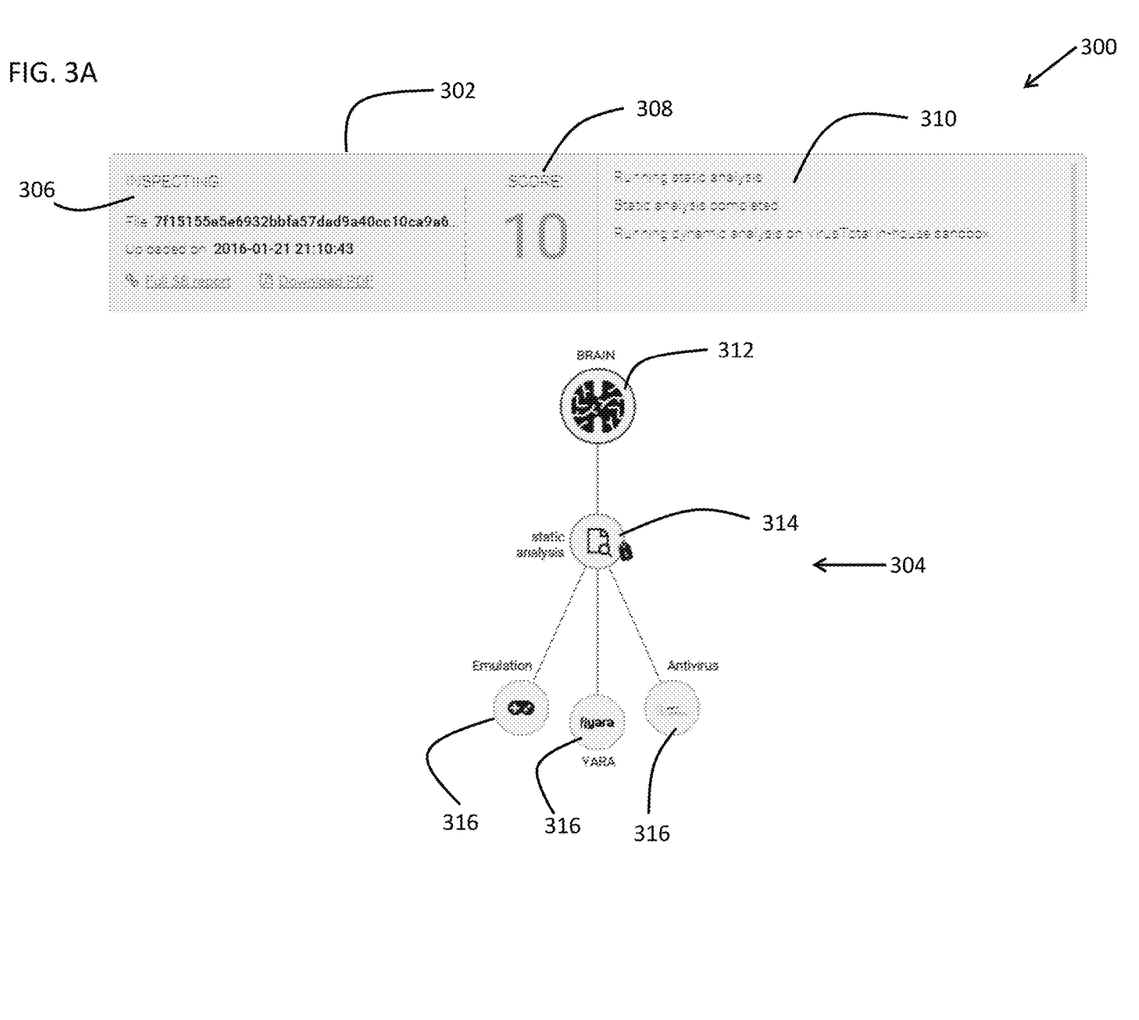
FIGS. 3A-3D are exemplary screenshots providing visualization of the analysis flow of a sample through a multi-analyzer array according to at least some embodiments of the present invention.

Visualization 300 is preferably displayed on a web browser of a client connected to visualizer 190. Client 102 that provides the sample for analysis is preferably presented with visualization 300 to show the status and flow of the analysis and to provide insight into the final threat score.

As shown in FIG. 3A the visualization 300 comprises a status bar 302 and a flow diagram 304. Status bar 302 provides an indication 306 of the sample being analyzed, the current calculated score 308 and the current analysis that is being performed 310.

At the start of an analysis, the only activity is the static analysis indication 314 which is initiated by the "brain" 312 which represents the array 100. As described above, the static analysis is based on three different analyses which are here depicted as icons 316 representing the emulation, YARA, and AV analysis.

Figure 3B:
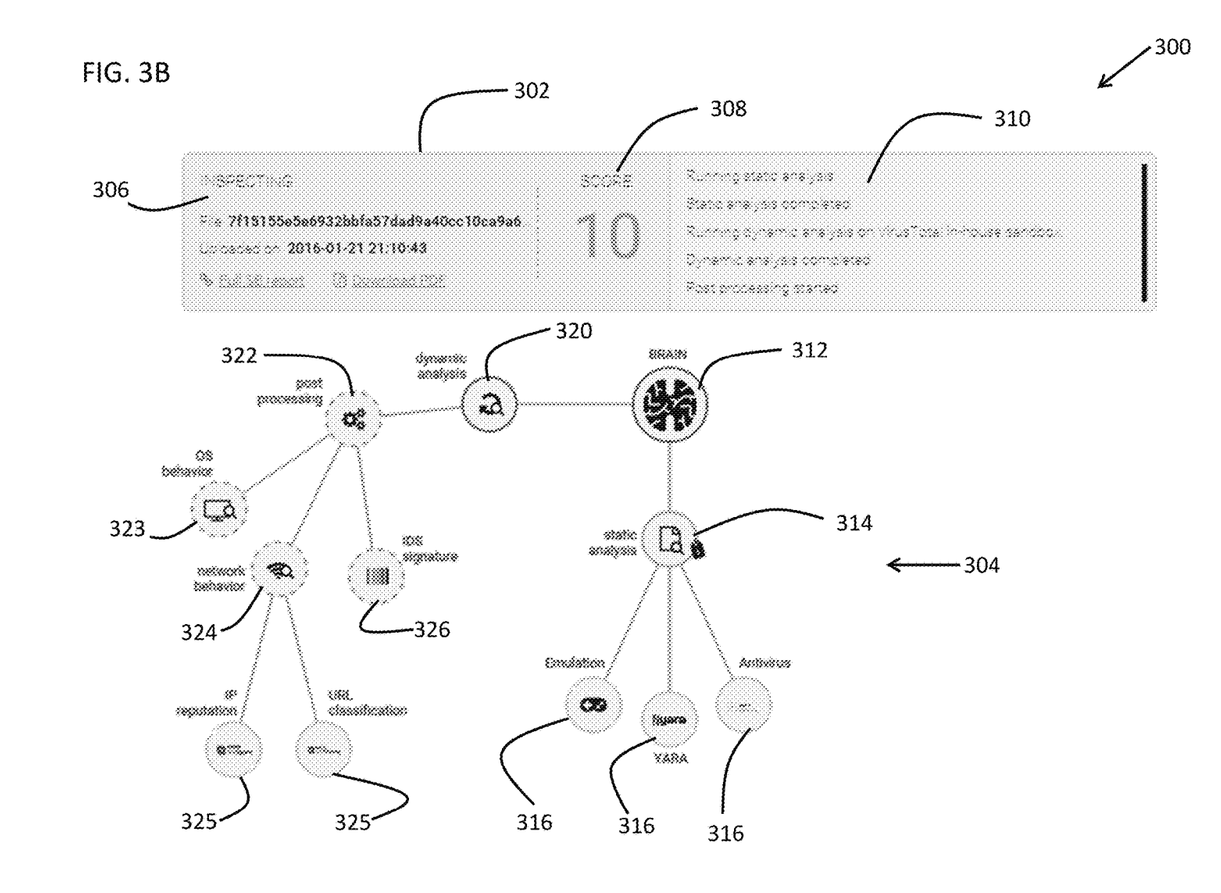

As shown in FIG. 3B, the next stage of an analysis is a dynamic analysis such as by one of analyzers 118 and as represented by icon 320. Icon 322 indicates that post-processing of the dynamic analysis has begun including indications of OS analysis 323, and network behavior analysis 324 including reputation analysis 325 and IDS analysis 326. The current analysis indication 310 shows "post processing started".

Figure 3C:
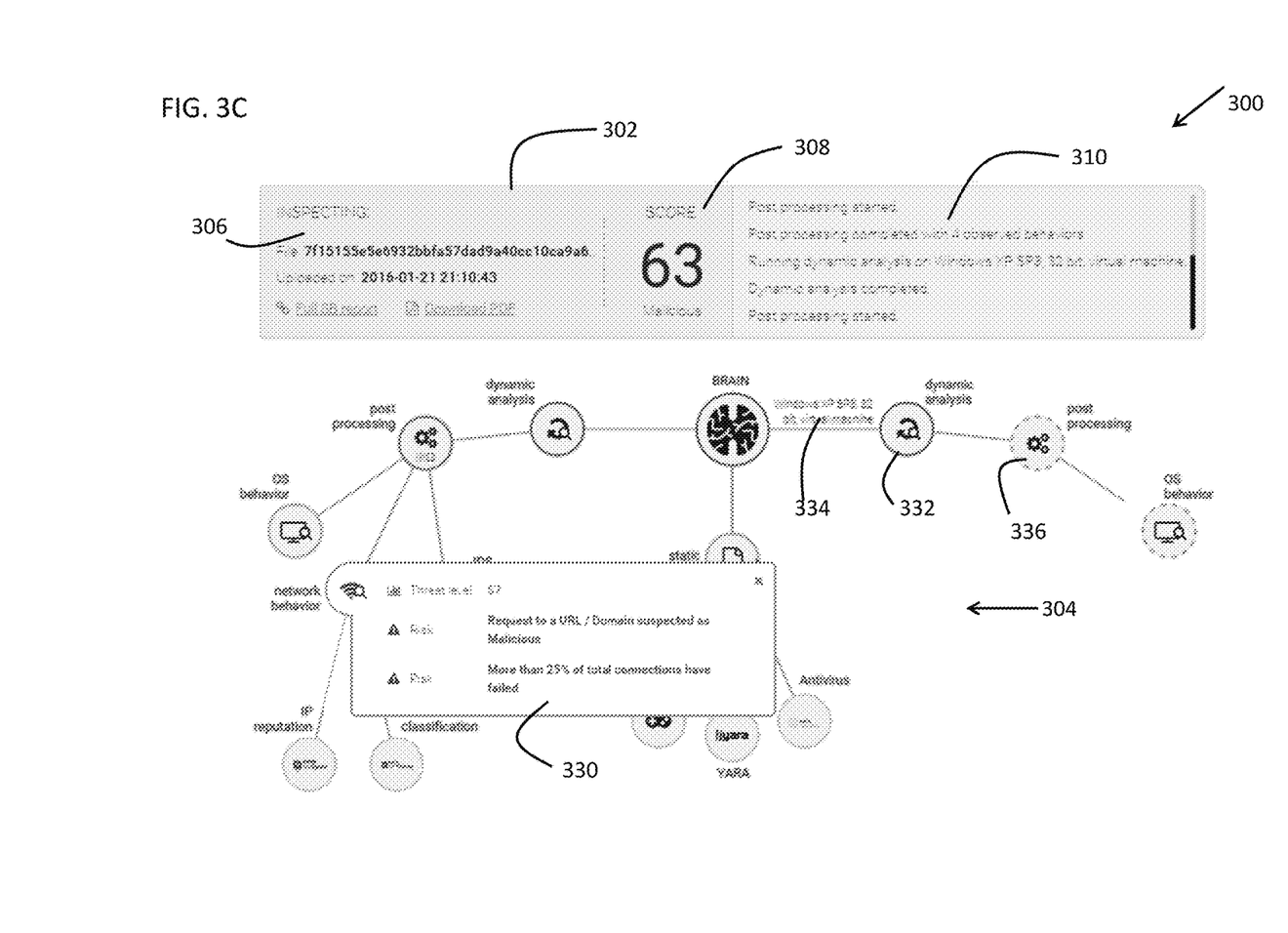

As shown in FIG. 3C, the results of the post processing of the first dynamic analysis can now be seen. Score indication 308 now shows a calculated score of 63 based on a combination of all observed behavior. It is also possible to click on a specific aspect of the sample analysis such as "network behavior" which will pop up analysis information bar 330 showing the results of the particular analysis. In the example shown in FIG. 3C, the calculated score (threat level) for network analysis alone is 57 based on the detected behavior of "Request to a URL/Domain suspected as Malicious", and "More than 25% of total connections have failed". The information of a suspected malicious domain is provided by one of reputation servers 134. As noted above the total score as shown in 308 is not a direct sum of all of the scores of all analyses, but rather a weighted combination according to an algorithm defined by the operator of DB 108.

The outlines of icons such as 322, 323, 324, and 326 (but preferably all icons) preferably change color to indicate the discovery of a threat. Non-limiting examples of such color codes include a green outline for no threat discovered, and orange outline indicating a medium threat level and a red outline indicating a definite threat discovered.

As described above, following the completion of a dynamic analysis and the related post processing analysis, the arbitrator 104 determines whether a further dynamic analysis is required. In this case such a determination has bene made and as indicated at 332 a further dynamic analysis in an analyzer with a different configuration—here 334 indicated as a Windows XP configuration—is initiated followed by further post processing 336. The current analysis indication 310 shows the activities that have occurred after the previous post processing related to the analysis (as in FIG. 3B) including: "Post processing completed with 4 observed behaviors", "Running dynamic analysis on Windows XP SP3, 32 bit, virtual machine", "Dynamic analysis completed", and "Post processing started".

Figure 3D:
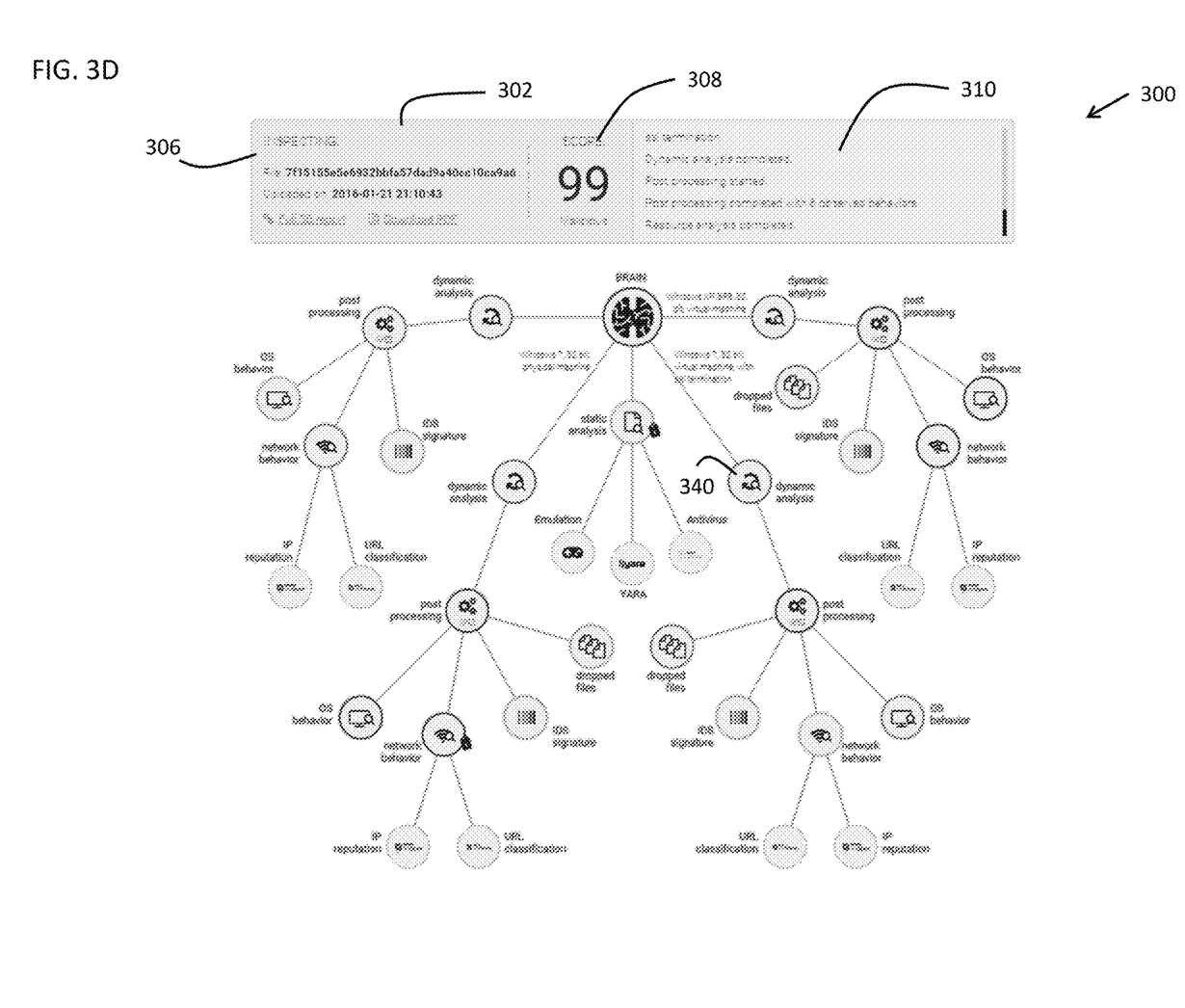

As shown in FIG. 3D, the analysis is completed. The final score 308 is 99 which is judged as "malicious". As shown, four dynamic analyses have been performed as determined by the arbitrator 104, including a fourth analysis (as shown by icon 340) with SSL termination since it was determined during the third dynamic analysis that such a configuration was required. Thus the visualization 300 shows the extent of the dynamic analysis undertaken by array 300 including additions to the scope of the analysis (such as further dynamic analyses) that were not initially planned following the static analysis.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the invention. Further combinations of the above features are also considered to be within the scope of some embodiments of the invention.

While the invention has been described with respect to a limited number of embodiments, it will be appreciated that many variations, modifications and other applications of the invention may be made.

What is claimed is:

1. A method for determining the threat level of a sample, comprising:

a. providing a multi-analyzer array running on a server comprising a static analyzer, a plurality of dynamic analyzers, an arbitrator, at least one post processing process, and a normalizer process, wherein at least two of the plurality of dynamic analyzers are sandboxes, wherein each of the at least two sandboxes is of a different sandbox developer;
  b. analyzing the sample by said static analyzer to produce a static analysis;
  c. review of said static analysis by said arbitrator to determine based on said static analysis which of said plurality of dynamic analyzers to utilize for dynamic analysis of said sample;
  d. by the normalizer, translating of the request to the determined dynamic analyzer from a generic request syntax into the request syntax used by the determined dynamic analyzer;
  e. dynamic analysis of the sample by the determined dynamic analyzers as chosen by said arbitrator to produce a dynamic analysis of said sample,
  f. normalizing said dynamic analysis by said normalizer to a format for post processing by said at least one post processing process;
  g. analysis of the normalized dynamic analysis by said at least one post processing process to provide a post processing analysis and to determine a threat level of said sample; and
  h. analysis by said arbitrator of said post processing analysis and said threat level of said sample to determine whether to further analyze said sample in one of said plurality of dynamic analyzers not previously chosen by said arbitrator.

2. The method of claim 1 wherein said at least one post processing process comprises a process selected from the group consisting of:
  a. an OS analyzer;
  b. a network analyzer;
  c. file analyzer;
  d. image analyzer; and
  e. scorer.

3. The method of claim 2 wherein said network analyzer gathers further analysis of network traffic from said reputation systems and/or IDS.

4. The method of claim 1 wherein said array further comprises a translator and wherein said translator translates requests for analysis sent to said analyzers.

5. The method of claim 1 wherein said array further comprises a database and wherein said database stores at least one of task queues for processes in said array; said dynamic or said static analyses.

6. The method of claim 1 wherein said sandbox comprises clients with configurations differentiated by at least one of: operating system, network configuration, software and/or hardware architecture, software configuration, or hardware configuration.

7. The method of claim 1 wherein at least one of said plurality of analyzers comprises a sandbox-less environment.

8. The method of claim 7 wherein said sandbox-less environment comprises application modules designed to simulate human activity, wherein said simulated activity includes at least one of mouse movements, keyboard strokes, website form interaction or dialog window interaction.

9. The method of claim 1 wherein each of said plurality of analyzers comprises a configuration selected from the group consisting of:

a. operating system,
b. network configuration,
c. software and/or hardware architecture,
d. software configuration,
e. hardware configuration, and
f. a combination of the above.

10. The method of claim 1 wherein said static analysis comprises at least one of basic emulation, YARA analysis and antivirus analysis.

11. The method of claim 1 further comprising providing a visualization of the said determining of said threat level comprising, via a web interface:
   a. graphically portraying the stages in said determining using said threat level with icons representing said static analysis, said dynamic analysis, and said post processing interconnected by lines illustrating the flow of said determining, and
   b. updating said determined threat level graphically represented by a score as said score is calculated.

12. A system for determining the threat level of a sample, comprising:
   a. a multi-analyzer array running on a server, wherein the server is a computing device comprising a data processor and the ability to execute one or more instructions, the array comprising:
      i. a static analyzer,
      ii. a plurality of dynamic analyzers, wherein at least two of the plurality of dynamic analyzers are sandboxes, wherein each of the at least two sandboxes is of a different sandbox developer,
      iii. an arbitrator,
      iv. at least one post processing process, and
      v. a normalizer process;
   wherein said sample is analyzed by said static analyzer to produce a static analysis; wherein said arbitrator reviews said static analysis to determine based on said static analysis which of said plurality of dynamic analyzers to utilize for dynamic analysis of said sample; wherein the normalizer translates the request to the determined dynamic analyzer from a generic request syntax into the request syntax used by the determined dynamic analyzer; wherein the determined dynamic analyzer as chosen by said arbitrator performs dynamic analysis of the sample to produce a dynamic analysis of said sample, wherein said normalizer normalizes said dynamic analysis to a format for post processing by said at least one post processing process; wherein said at least one post processing process analyzes the normalized dynamic analysis to provide a post processing analysis and to determine a threat level of said sample; and wherein said arbitrator analyzes said post processing analysis and said threat level of said sample to determine whether to further analyze said sample in one of said plurality of dynamic analyzers not previously chosen by said arbitrator.

13. The system of claim 12 wherein said at least one post processing process comprises a process selected from the group consisting of:
   a. an OS analyzer;
   b. a network analyzer;
   c. file analyzer;
   d. image analyzer; and
   e. scorer.

14. The system of claim 13 wherein said array further comprises reputation systems and IDS and said network analyzer gathers further analysis of network traffic from said reputation systems and/or IDS.

15. The system of claim 12 wherein said array further comprises a translator and wherein said translator translates requests for analysis sent to said analyzers.

16. The system of claim 12 wherein said array further comprises a database and wherein said database stores at least one of task queues for processes in said array; said dynamic or said static analyses.

17. The system of claim 12 wherein said sandbox comprises clients with configurations differentiated by at least one of: operating system, network configuration, software and/or hardware architecture, software configuration, or hardware configuration.

18. The system of claim 12 wherein at least one of said plurality of analyzers comprises a sandbox-less environment.

19. The system of claim 18 wherein said sandbox-less environment comprises application modules designed to simulate human activity, wherein said simulated activity includes at least one of mouse movements, keyboard strokes, website form interaction or dialog window interaction.

20. The system of claim 12 wherein each of said plurality of analyzers comprises a configuration selected from the group consisting of:
   a. operating system,
   b. network configuration,
   c. software and/or hardware architecture,
   d. software configuration,
   e. hardware configuration, and
   f. a combination of the above.

21. The system of claim 12 wherein said static analysis comprises at least one of basic emulation, YARA analysis and antivirus analysis.

22. The system of claim 12 wherein said array comprises a visualizer and wherein said visualizer provides a visualization of the said determining of said threat level comprising, via a web interface, graphically portraying the stages in said determining said threat level with icons representing said static analysis, said dynamic analysis, and said post processing interconnected by lines illustrating the flow of said determining, and updating said determined threat level represented by a score as said score is calculated.

23. The system of claim 12 wherein said static analysis comprises determining expected behavior of the sample and wherein analysis of the normalized dynamic analysis comprises determining whether the sample performed according to the expected behavior.

24. The system of claim 12 wherein determining whether to further analyze said sample in one of said plurality of dynamic analyzers is based on a factor chosen from the list consisting of:
   a. whether the sample exhibited all of the expected behavior determined as part of the static analysis;
   b. evasion by the sample of the first dynamic analyzer;
   c. incompatibility of the first dynamic analysis environment;
   d. whether additional behaviors of the sample were exposed in the first dynamic analysis necessitating a further analysis;
   e. whether a further analysis will significantly add to a determined malware score;
   f. whether a further analysis will provide more and valuable information about the sample; and
   g. a combination of the above.

* * * * *